(Model.)

I. D. COMSTOCK.
CHAIR SEAT.

No. 270,749. Patented Jan. 16, 1883.

Attest:
A. Barthel
Charles J. Hunt

Inventor:
Isaac D. Comstock
by Rob. S. Sprague
Atty

UNITED STATES PATENT OFFICE.

ISAAC D. COMSTOCK, OF ADRIAN, MICHIGAN.

CHAIR-SEAT.

SPECIFICATION forming part of Letters Patent No. 270,749, dated January 16, 1883.

Application filed March 4, 1882. (Model.)

*To all whom it may concern:*

Be it known that I, ISAAC D. COMSTOCK, of Adrian, in the county of Lenawee and State of Michigan, have invented new and useful Improvements in Chair-Seats; and I hereby declare that the following is a full, clear, and exexact description thereof, reference being had to the accompanying drawings, which form a part of this specification.

This invention relates to that class of inventions known as "close-woven" cane seats and backs, in which the cane is properly secured to the frame without passing entirely around said frame; and it consists in the peculiar construction and combination of parts, as more fully hereinafter described and claimed.

Figure 1:
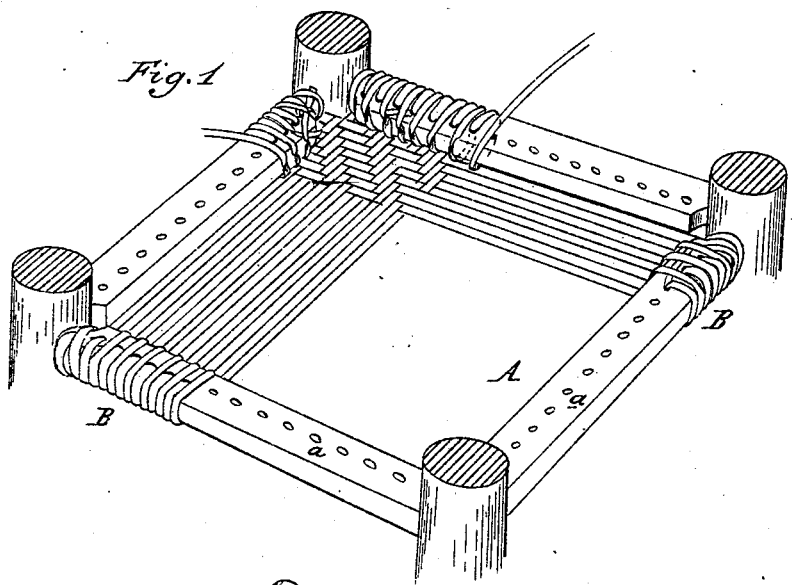
Figure 2:
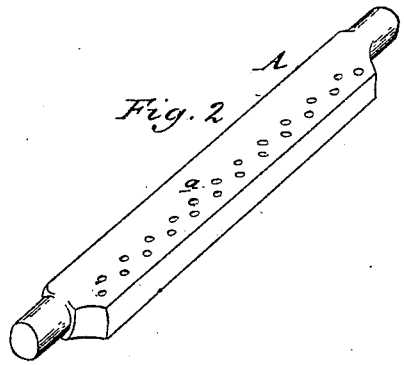

In the accompanying drawings, Figure 1 represents a bottom perspective view of my device; and Fig. 2 is a perspective view of a modified form of one of the bars or rounds of the frame.

A represents the seat-frame of a chair, and *a* the bars or rounds thereof, said bars being provided with a series of holes, of which the distance from center to center is equal to the width of two strands of cane.

B represents the seat-edges as they appear when the canes are woven.

The manner of weaving the canes is as follows: Commencing with a single cane at one of the posts, I make a half-hitch around one of the bars *a* to secure one end of the cane close to the leg of the chair, and then draw it across the top of the frame to the opposite bar, where it is passed around said bar to the bottom thereof, up through the first hole, then inward and downward over the inner edge of the bar and twisted to bring its face outward, and then under and around the bar over the outside to the opposite round, and so on through each succeeding hole, until the frame is filled with canes running in one direction. The crosscanes are then secured to the other bars of the frame in the same manner, and are woven with the first canes to form any desired pattern. Where very narrow canes are used the holes are placed zigzag, as shown in Fig. 2, to avoid weakening the bar by placing them in a straight line.

It will be seen from the manner of weaving the canes, as herein shown and described, that the canes, although passed through holes in the bars, do not weaken the same, for the reason that they are also wound around the outside of the bars and exert the strain at the strongest part.

What I claim is—

A chair seat or back composed of a frame having perforated bars and a cover of cane in which the strand is secured by one end at the top of one bar and passes therefrom across the frame to the top of the opposite bar, around the outside thereof to the bottom, up through one of the perforations, around the inside and downward, twisted to bring the face outward, around the outside over the top, across the frame to the first-mentioned bar, and so on back and forth to the ends of the bars.

ISAAC D. COMSTOCK.

Witnesses:
H. S. SPRAGUE,
CHARLES J. HUNT.